US008963928B2

(12) United States Patent
Koike

(10) Patent No.: US 8,963,928 B2
(45) Date of Patent: Feb. 24, 2015

(54) STEREOSCOPIC IMAGE PROCESSING APPARATUS AND STEREOSCOPIC IMAGE PROCESSING METHOD

(75) Inventor: Tsutomu Koike, Yokohama (JP)

(73) Assignee: JVC Kenwood Corporation (JP)

( * ) Notice: Subject to any disclaimer, the term of this patent is extended or adjusted under 35 U.S.C. 154(b) by 303 days.

(21) Appl. No.: 13/409,858

(22) Filed: Mar. 1, 2012

(65) Prior Publication Data

US 2012/0223944 A1    Sep. 6, 2012

(30) Foreign Application Priority Data

Mar. 1, 2011    (JP) ................................ 2011-044411

(51) Int. Cl.
  *G06T 13/00*    (2011.01)
  *H04N 17/00*    (2006.01)
  *H04N 13/00*    (2006.01)
(52) U.S. Cl.
  CPC ...... *H04N 17/004* (2013.01); *H04N 2013/0081* (2013.01)
  USPC .......................................... 345/473; 345/629
(58) Field of Classification Search
  USPC .......................................... 345/419, 473, 629
  See application file for complete search history.

(56) References Cited

U.S. PATENT DOCUMENTS

| 5,664,572 | A  | * | 9/1997 | Kishimoto ..................... 600/443 |
| 7,725,828 | B1 | * | 5/2010 | Johnson ........................ 715/726 |
| 2007/0291152 | A1 | * | 12/2007 | Suekane et al. ........... 348/333.02 |
| 2009/0002381 | A1 | * | 1/2009 | Harper et al. ................. 345/522 |
| 2010/0302355 | A1 | * | 12/2010 | Tamaru ........................... 348/59 |
| 2011/0109720 | A1 | * | 5/2011 | Smolic et al. .................... 348/43 |

FOREIGN PATENT DOCUMENTS

JP    2010-147940    7/2010

* cited by examiner

*Primary Examiner* — Maurice L McDowell, Jr.
*Assistant Examiner* — Kyle Zhai
(74) *Attorney, Agent, or Firm* — Cantor Colburn LLP

(57) ABSTRACT

Provided is a stereoscopic image processing apparatus allowing a manufacturer of image data to grasp parallax of a subject in display data easily and accurately. The stereoscopic image processing apparatus includes units: acquiring two pieces of image data having horizontal parallax; composing the two pieces of image data to generate display data; deriving parallax of a predetermined object in the two pieces of image data and generates parallax information representing the parallax; holding the generated parallax information in relation to time information assigned to each piece of the image data; generating parallax time image data representing the parallax represented by the parallax information and time represented by the time information as a two-dimensional image; causing the generated parallax time image data and the display data to overlap each other; and displaying the display data overlapping the parallax time image data on a display unit.

4 Claims, 16 Drawing Sheets

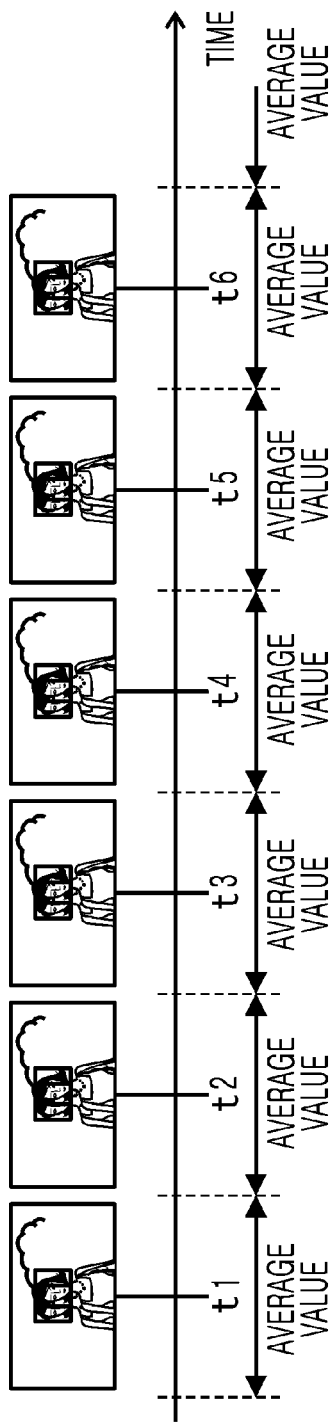

| IDENTIFICATION CODE 172a | MANAGEMENT NUMBER 172b | TIME 170 | PARALLAX (pixel) 172c | PARALLAX RATIO(%) 172d |
|---|---|---|---|---|
| 0001 | 0005 | t1 | +360 | +18.8 |
| 0001 | 0005 | t2 | +380 | +19.8 |
| 0001 | 0005 | t3 | +400 | +20.8 |
| 0001 | 0005 | t4 | +20 | +1.0 |
| 0001 | 0005 | t5 | −70 | −3.6 |
| 0001 | 0005 | t6 | −80 | −4.2 |
| ⋮ | ⋮ | ⋮ | ⋮ | ⋮ |

STEREOSCOPIC IMAGE PROCESSING APPARATUS AND STEREOSCOPIC IMAGE PROCESSING METHOD

CROSS-REFERENCE TO RELATED PATENT APPLICATIONS

This application claims the benefit of Japanese Patent Application No. 2011-044411, filed on Mar. 1, 2011, in the Japanese Patent Office, the disclosure of which is incorporated herein in its entirety by reference.

BACKGROUND OF THE INVENTION

1. Field of the Invention

The present invention relates to a stereoscopic image processing apparatus and a stereoscopic image processing method capable of displaying display data for allowing a viewer to perceive a stereoscopic image.

2. Description of the Related Art

Recently, a stereoscopic image technology that provides two images having horizontal parallax (binocular parallax) on a display so that a viewer may perceive the displayed images as a stereoscopic image of a subject has been highlighted. The two images used in the above technology are images captured from different optical axes (viewpoints), or images of computer graphics (CGs) corresponding to images captured at different optical axes. A location where the subject image included in the two images in a perspective direction is formed is determined according to a degree of parallax between the two images of the subject image.

As described above, although the image forming location of the subject image in the perspective direction may be changed by adjusting the parallax between the two images of the subject, if the subject image is formed to excessively protrude or to excessively be recessed by having the parallax too large, the viewer may feel fatigue. Therefore, there is provided a technology of automatically adjusting the parallax to be a desired value by detecting a face of a predetermined person in two pieces of data of the two images and deriving parallax of the face, and then moving the subject image in one piece of the data of the two images horizontally if the derived parallax is not equal to the desired value (for example, Patent Reference 1).

When two images for allowing a viewer to perceive a stereoscopic image are generally manufactured, a manufacturer (operator) generates image data of each of scenes by taking pictures or manufacturing CGs, and after that, connects image data of every scene to each other. In addition, scenes are formed by partitioning, for example, an operation performed in a predetermined place at predetermined time intervals.

Here, if the technology disclosed in Patent Reference 1 is used, parallax may be adjusted in every scene; however, the manufacturer cannot grasp a degree of parallax quantitatively. Also, if parallax is set simply to a desired value by using the technology disclosed in Patent Reference 1, an amount of protrusion or recession of a subject image may be reduced to the desired value, and thus the image may become flat.

[Patent Document 1] Japanese Patent Laid-Open Publication No. 2010-147940

SUMMARY OF THE INVENTION

The present invention provides a stereoscopic image processing apparatus and a stereoscopic image processing method capable of allowing a manufacturer of image data to grasp parallax of a subject image in display data easily and accurately.

According to an aspect of the present invention, a stereoscopic image processing apparatus includes: an image data acquiring unit which acquires two pieces of image data having horizontal parallax; a split and composition unit which composes the two pieces of image data to generate display data; a parallax information derivation unit which derives parallax of a predetermined object in the two pieces of image data and generates parallax information representing the parallax; an information holding unit which holds the generated parallax information in relation to time information assigned to each piece of the image data; a data generator which generates parallax time image data representing a two-dimensional image in which the parallax represented by the parallax information and time represented by the time information are shown to correspond to each other; a data overlapping unit which causes the generated parallax time image data and the display data to overlap each other; and a display controller which displays the display data overlapping the parallax time image data on a display unit.

According to another aspect of the present invention, a stereoscopic image processing method includes: acquiring two pieces of image data having horizontal parallax; deriving parallax of a predetermined object in the two pieces of image data and generating parallax information representing the parallax; holding the generated parallax information in relation to time information assigned to the image data; generating parallax time image data representing a two-dimensional image in which the parallax information and the time information are shown to correspond to each other; generating display data by composing the two pieces of image data; causing the parallax time image data and the display data to overlap each other; and displaying the display data overlapping the parallax time image data on a display unit.

BRIEF DESCRIPTION OF THE DRAWINGS

The above and other features and advantages of the present invention will become more apparent by describing in detail exemplary embodiments thereof with reference to the attached drawings in which:

FIGS. 6A and 6B are diagrams for describing an example of processes of a memory controller;

DETAILED DESCRIPTION OF THE INVENTION

Figure 1:
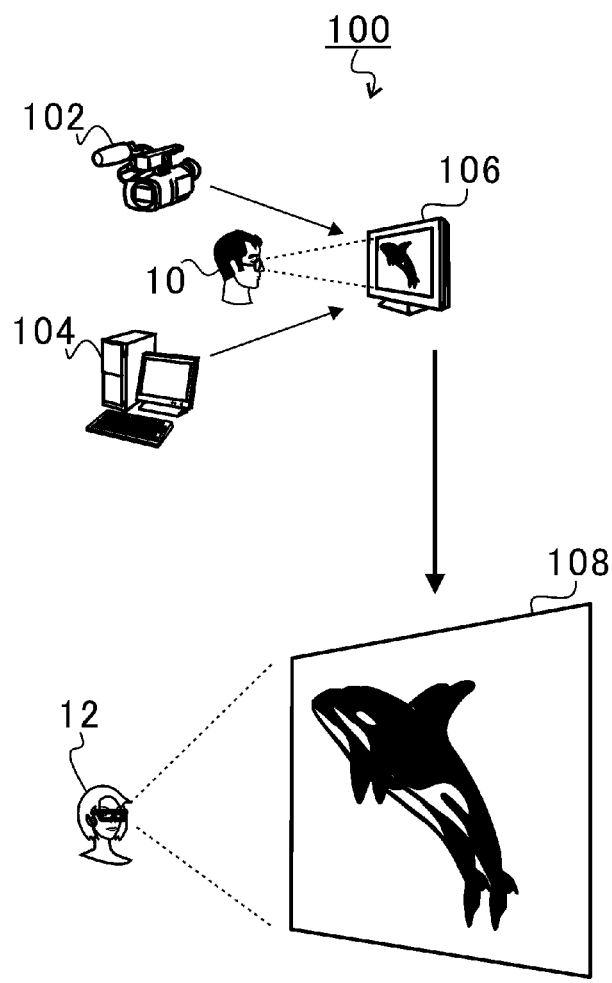
FIG. 1 is a functional block diagram showing schematic relations of a stereoscopic image manufacturing system.

Hereinafter, the present invention will be described in detail for preferred embodiments of the invention with reference to the accompanying drawings. The dimension, materials, and other specific numerical values represented as examples in the embodiments of the present invention are intended not to limit but to easily understand the present invention. Like elements having the same function or structure denote like reference numerals in the description and the drawings and repeated descriptions thereof will be omitted.

(Stereoscopic Image Manufacturing System 100)

FIG. 1 is a functional block diagram showing schematic relations of a stereoscopic image manufacturing system 100. The stereoscopic image manufacturing system 100 includes an apparatus for generating two pieces of image data having horizontal parallax by a manufacturer 10, for example, a stereoscopic image capturing apparatus 102 for capturing images or a computer 104 for generating computer graphics (CGs), and a stereoscopic image processing apparatus 106 for displaying generated image data. Image data manufactured by using the stereoscopic image manufacturing system 100 may be provided to a viewer 12 for example through a screen 108 of a theater, and the viewer 12 may see the provided image data by wearing polarized glasses or the like. In the embodiment, a person who manufactures the image data is referred to as the manufacturer 10 and a person who observes the image data is referred to as the viewer 12 for the convenience of comprehension; however, the present embodiment is not limited by users, of course.

In the present embodiment, when the manufacturer 10 edits the generated two pieces of image data or the like, parallax of a predetermined subject image in the two pieces of image data may be easily identified by displaying the two pieces of image data on the stereoscopic image processing apparatus 106. Hereinafter, a detailed structure of the stereoscopic image processing apparatus 106 will be described.

(Stereoscopic Image Processing Apparatus 106)

Figure 2:
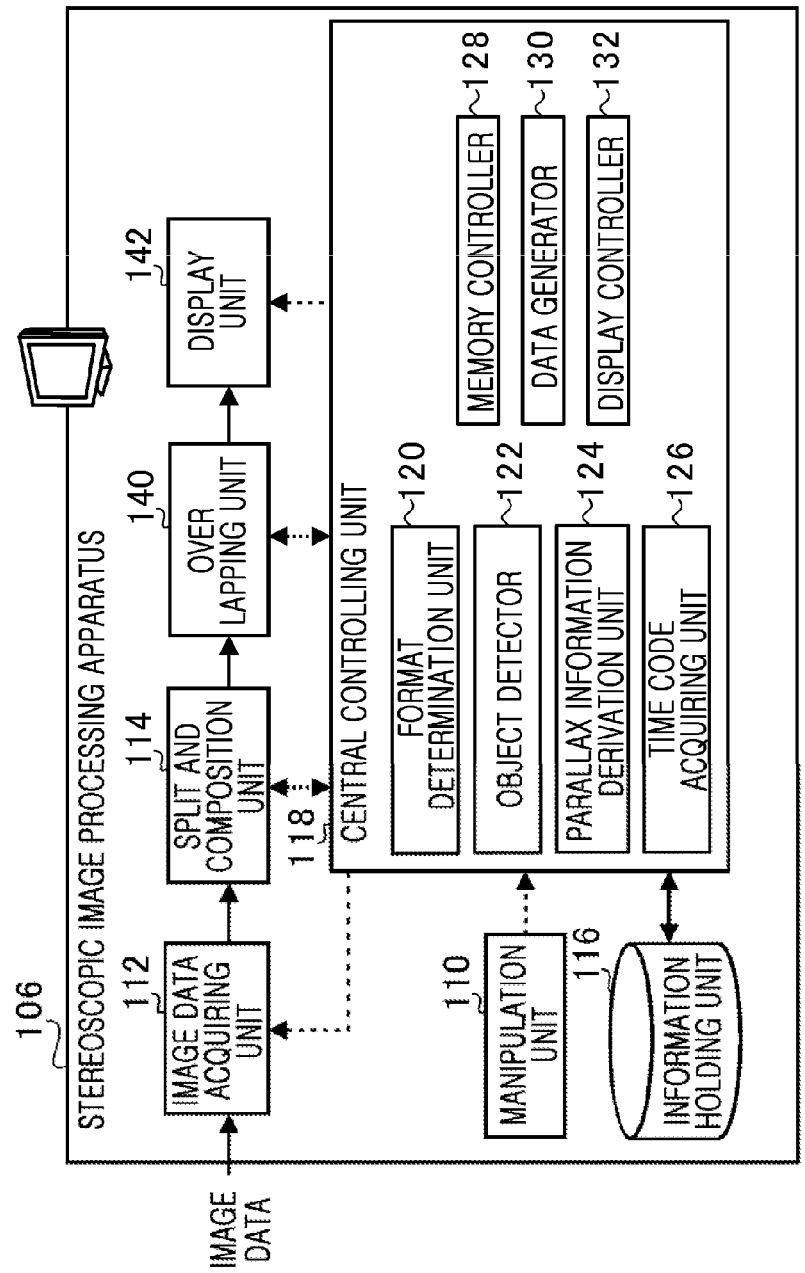
FIG. 2 is a functional block diagram showing schematic functions of a stereoscopic image processing apparatus.

FIG. 2 is a functional block diagram showing schematic functions of the stereoscopic image processing apparatus 106. As shown in FIG. 2, the stereoscopic image processing apparatus 106 includes a manipulation unit 110, an image data acquiring unit 112, a split and composition unit 114, an information holding unit 116, a central controlling unit 118, a data overlapping unit 140, and a display unit 142. In FIG. 2, solid lines denote flow of data, and dotted lines denote flow of control signals.

In the present embodiment, according to a manipulation input of the manufacturer 10 via the manipulation unit 110, the central control unit 118 sequentially extracts parallax between two pieces of image data acquired by the image data acquiring unit 112, and switches into, for example, a parallax derivation mode in which parallax of one piece of content is derived from the stream of image data of the entire one piece of content, and into a parallax display mode in which parallax time image data is generated based on the derived parallax and in which data formed by causing the parallax time image data and display data to overlap each other is displayed on the display unit 142. The parallax time image data will be described later.

The manipulation unit 110 consists of a manipulation key including a power switch, a cross-shaped key, a joy stick, a touch panel disposed on a display surface of the display unit 142, or the like to receive a manipulation input of the manufacturer 10. In addition, when a remote controller for remote manipulation is provided, the remote controller also functions as the manipulation unit 110.

The image data acquiring unit 112 acquires two pieces of image data, that is, left and right image data, having horizontal parallax (hereinafter, each of the two pieces of image data will be referred to as right eye image data and left eye image data in a case where there is a need to distinguish the left and right images from each other) via an image signal input terminal such as a high-definition multimedia interface (HDMI) terminal or the like, wherein the left and right image data are obtained from images captured at optical axes (viewpoints) different from each other, or images of CG (computer graphic) corresponding to images captured at different optical axes for perceiving a stereoscopic image in the parallax derivation mode and the parallax display mode. Here, the left and right eye image data may be independently acquired, or may be acquired as integrated data.

Here, format types of the integrated data may include an LR independent type in which two pieces of image data are juxtaposed in left and right sides, a side-by-side type in which two pieces of image data are compressed to half horizontally and juxtaposed in left and right sides, an above and below type in which two pieces of image data are compressed to half in a vertical direction (perpendicular direction) and juxtaposed in up and down sides, a frame sequential type in which two pieces of image data are alternately disposed in a time sequential direction, or the like.

The split and composition unit 114 splits the two pieces of image data acquired by the image data acquiring unit 112 according to a control signal output from a format determination unit 120 that will be described later in the parallax derivation mode, and uses the split image data in a detection process performed by an object detector 122 that will be described later or in a parallax derivation process performed by a parallax information derivation unit 124.

Also, the split and composition unit 114 firstly splits the two pieces of image data acquired by the image data acquiring unit 112 according to a control signal output from the format determination unit 120 in the parallax display mode, and composes the split two pieces of image data according to a display type of the display unit 142 in order to display the display data. The display type may be a line by line type, a checkerboard type, an anaglyph type, or a color code 3D type, which is a passive type, a frame sequential type, which is an active type, or the like.

The line by line type is a method of disposing two kinds of polarization filters having polarization properties different from each other in alternate lines (every horizontal line) on the display surface of the display unit 142, and displaying right eye image data on odd-numbered lines in which a kind of polarization filter is disposed, and left eye image data on even-numbered lines in which another kind of polarization filter is disposed. The checkerboard type is a method of aligning two different kinds of polarization filters having different polarization properties in each of pixels, not lines. The anaglyph type is a method of representing right eye image data and left eye image data in different colors, for example, red and blue, and visualizing the image data exclusively to a right eye and a left eye of the viewer 12 by using colored glasses in which red and blue color filters are applied. The color code 3D type is a method that improves reproducibility of colors by using blue and amber-based colors instead of the two colors used in the anaglyph method. The frame sequential type is a method of displaying right eye image data and left eye image data alternately on the display unit 142, and visualizing the right eye image data only to a right eye of the manufacturer 10 and the left eye image data only to a left eye of the manufacturer 10 through an electronic shutter that is exclusively opened/closed.

Figure 3:
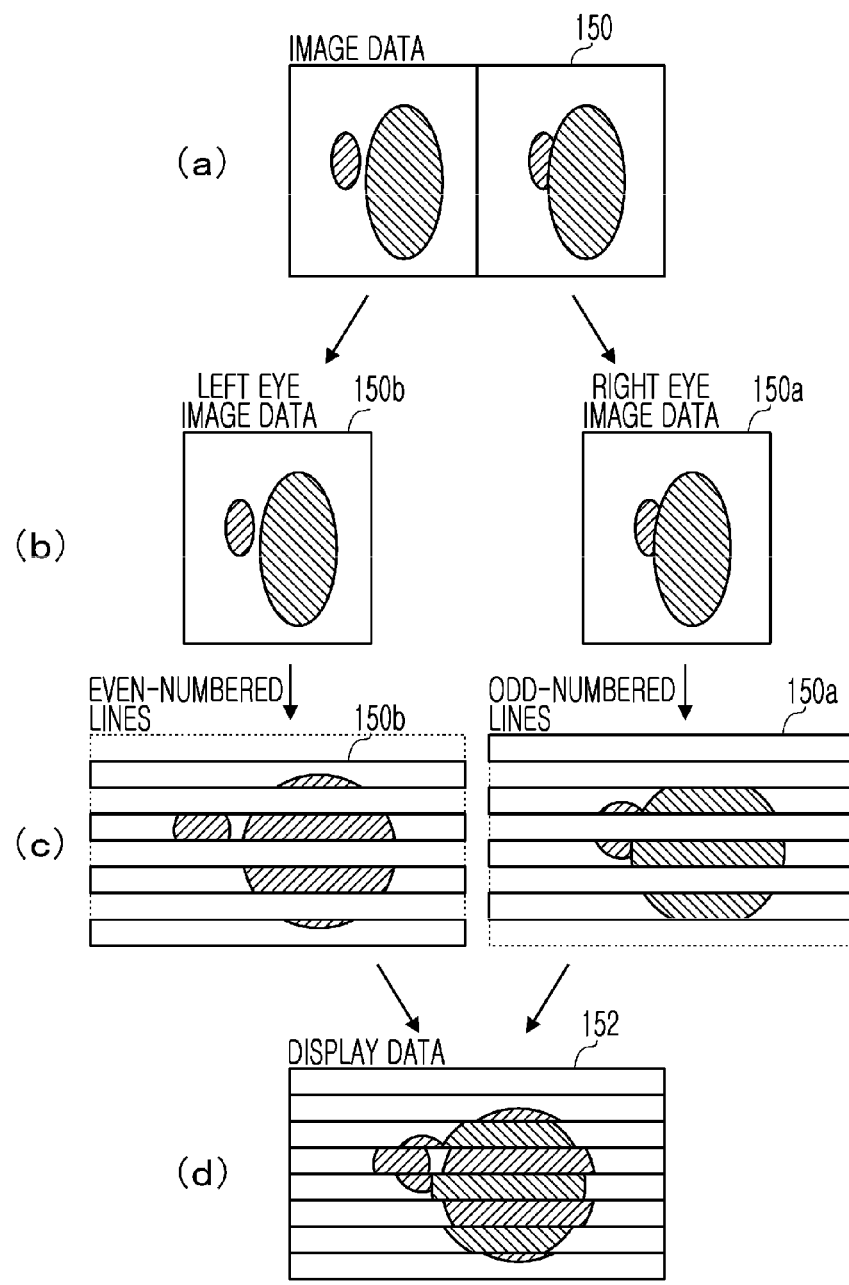
FIG. 3 is a diagram for describing processes of a split and composition unit in a parallax display mode.

FIG. 3 is a diagram for describing processes of the split and composition unit 114 in the parallax display mode. For example, when the image data acquiring unit 112 acquires image data 150 of the side by side type, in which two pieces of image data are integrated as shown in FIG. 3(a), the split and composition unit 114 firstly splits the image data 150 into right eye image data 150a and left eye image data 150b, as shown in FIG. 3(b). Then, the split and composition unit 114 extracts image data of odd-numbered lines from the right eye image data 150a and extracts image data of even-numbered lines from the left eye image data 150b, and at the same time, magnifies images to be twice as large as the original ones in a horizontal direction as shown in FIG. 3(c) and finally composes the odd-numbered lines of the right eye image data 150a and the even-numbered lines of the left eye image data 150b to generate display data 152 of the line by line type as shown in FIG. 3(d). Here, the total number of lines is eight for the convenience of description; however, the actual total number of lines is equal to the number of scanning lines (for example, 1080), and thus the display data 152 may be recognized as if images of a subject overlap each other according to the parallax when the display data 152 is observed with naked eyes.

The manufacturer 10 observes the display data 152 via polarized glasses in which two polarization filters having polarization properties different from each other are provided in the parallax display mode, and then sees only the right eye image data 150a with his/her right eye and sees only the left eye image data 150b with his/her left eye. Therefore, the manufacturer 10 may perceive a stereoscopic image since a subject image is formed on a side protruding from the display unit 142 or a side recessed from the display unit 142.

The information holding unit 116 may include a storage medium such as a random access memory (RAM), a hard disk drive (HDD), a flash memory, a non-volatile RAM, or the like to hold various pieces of information. In the parallax derivation mode, the information holding unit 116 sequentially holds parallax information derived by the parallax information derivation unit 124 in relation to time information acquired by a time code acquiring unit 126, to be provided to the parallax display mode. In addition, the parallax information is information representing parallax, and the time information is information representing time.

The central controlling unit 118 manages and controls whole of the stereoscopic image processing apparatus 106 by using a semiconductor integrated circuit including a central processing unit (CPU), a read only memory (ROM) in which a program or the like is accommodated, a RAM as a work area or the like. In addition, in the present embodiment, the central controlling unit 118 functions also as the format determination unit 120, the object detector 122, the parallax information derivation unit 124, the time code acquiring unit 126, a memory controller 128, a data generator 130, and a display controller 132.

The format determination unit 120 determines whether the two pieces of image data acquired by the image data acquiring unit 112 are acquired independently or as integrated data in the parallax derivation mode and the parallax display mode. In addition, when the format determination unit 120 determines that the two pieces of image data are acquired as integrated data, the format determination unit 120 also determines whether the format type of the image data is the LR independent type, the side by side type, the above and below type, or the frame sequential type, and outputs the determination result to the split and composition unit 114. The split and composition unit 114 recognizes the format type of the two pieces of image data according to the determination result, and splits the two pieces of image data based on the format type. Otherwise, the format determination unit 120 does not automatically determine the format type of the two pieces of image data acquired by the image data acquiring unit 112, but may output the format type selected by a manipulation input of the manufacturer 10 to the split and composition unit 114.

The object detector 122 detects predetermined objects in the two pieces of image data by using, for example, a conventional face recognition technology for recognizing faces based on evaluation values representing face-likeness of human beings and pattern matching of extracted faces, in the parallax derivation mode and the parallax display mode. The object detector 122 detects the predetermined objects in the two pieces of image data, and at the same time, generates management numbers for identifying the predetermined objects, which are stored in the information holding unit 116, in the parallax derivation mode. Here, the predetermined objects (for example, a face of a subject that is desired to be photographed) detected by the object detector 122 may be determined by the manipulation input of the manufacturer 10 or may be determined in advance.

Figure 4:
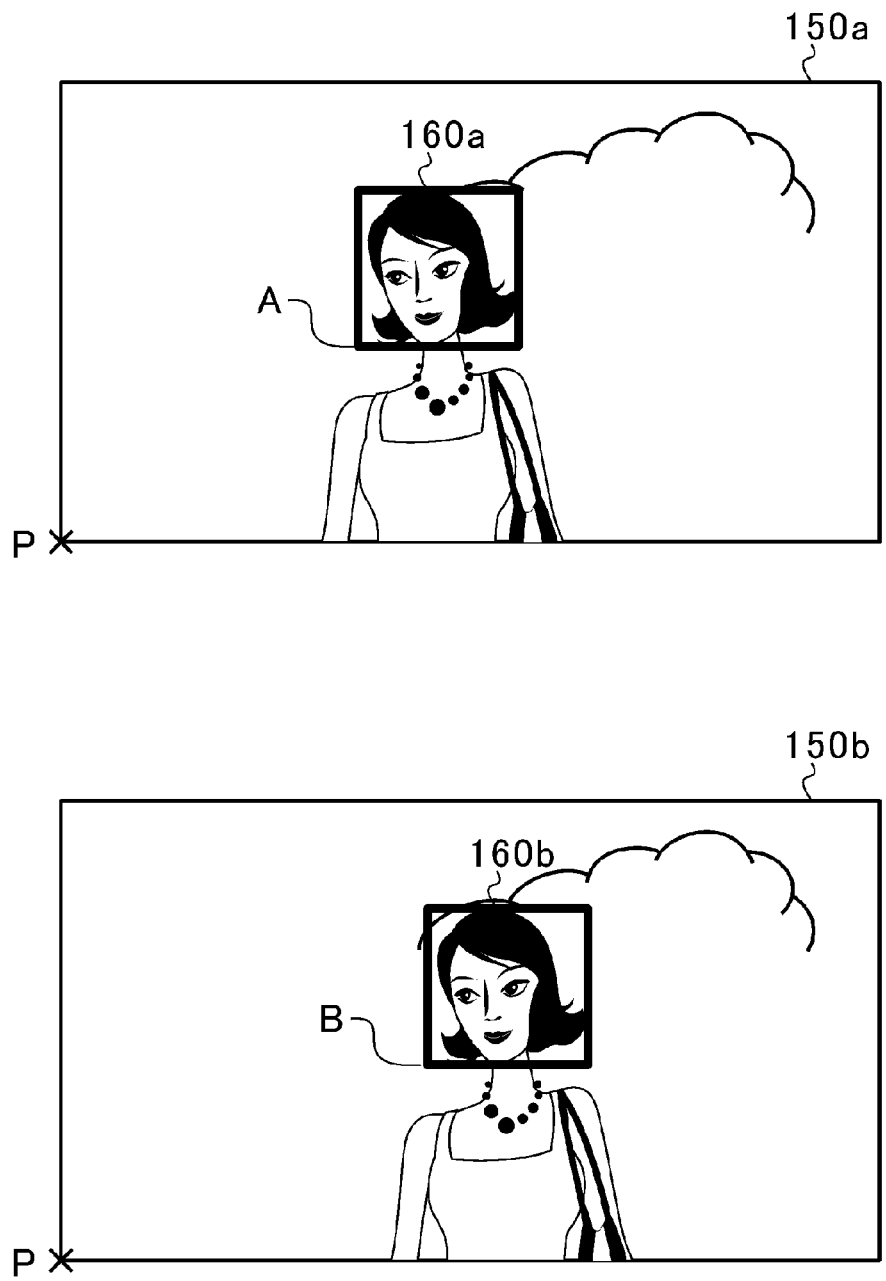
FIG. 4 is a diagram for describing operations of an object detector.

FIG. 4 is a diagram for describing operations of the object detector 122. The object detector 122 detects a predetermined object (here, a face of a predetermined person) in each of the right eye image data 150a and the left eye image data 150b of one frame based on, for example, manipulation input of the manufacturer 10. In addition, the object detector 122 generates, for example, a face detection frame 160 (represented by reference numerals 160a and 160b in FIG. 4) representing a range of the face of the predetermined person in each of the right image data 150a and the left image data 150b. Then, the object detector 122 derives a representative coordinate A of the face detection frame 160a in the right eye image data 150a and a representative coordinate B of the face detection frame 160b in the left eye image data 160b, based on a crossed point P where a left end and a lower end of the image data 150 cross each other as an origin. Here, for example, a point where a left end and a lower end of the face detection frame 160 cross each other in FIG. 4 is a representative coordinate.

The parallax information derivation unit 124 derives parallax $\Delta X$ between the face of the predetermined person in the right eye image data 150a and the face of the predetermined person in the left eye image data 150b, based on the representative coordinates A and B derived by the object detector 122, in the parallax derivation mode. Here, the parallax information derivation unit 124 derives the parallax $\Delta X$ in every frame.

Figure 5:
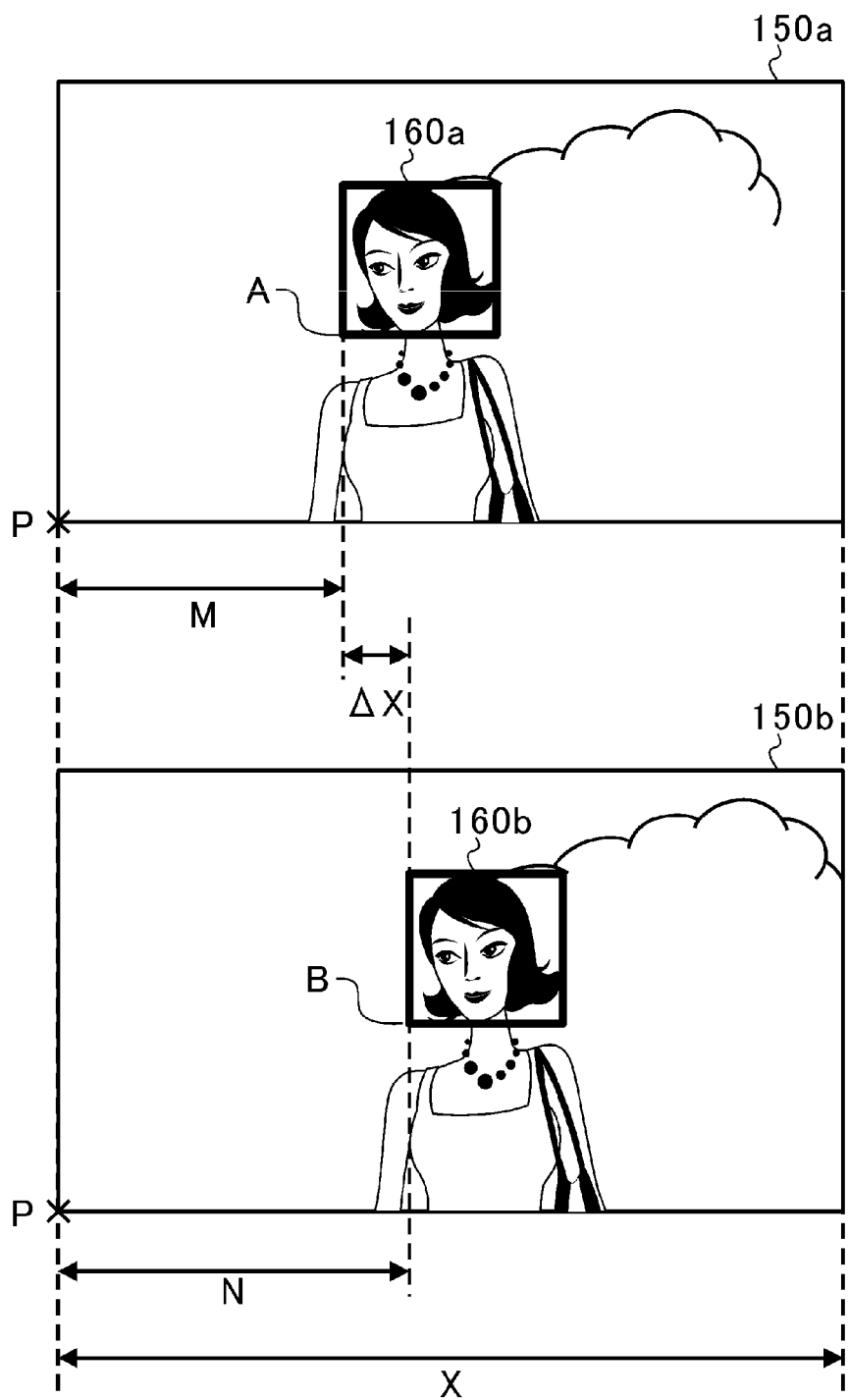
FIG. 5 is a diagram for describing processes of a parallax information derivation unit.

FIG. 5 is a diagram for describing processes of the parallax information derivation unit 124. As shown in FIG. 5, the parallax information derivation unit 124 derives a horizontal distance M from the origin P to the representative coordinate A in the right eye image data 150a. In addition, the parallax information derivation unit 124 derives a horizontal distance N from the origin P to the representative coordinate B in the left eye image data 150b. Then, the parallax information derivation unit 124 derives parallax $\Delta X$ by using the following Equation 1. Here, the distance N, the distance M, and the parallax $\Delta X$ are derived to the number of pixels.

$$\Delta X = N - M \quad (1)$$

In addition, the parallax information derivation unit 124 may derive a parallax ratio Q, that is, a ratio (%) between the parallax ΔX and a display width X by using the following Equation 2.

$$Q = \Delta X/X \times 100 \, (\%) \quad (2)$$

In addition, the parallax information derivation unit 124 averages the parallax ΔX of a predetermined number of frames, and averages the parallax ratio Q of a predetermined number of frames to generate parallax information representing the average values, respectively.

The time code acquiring unit 126 acquires time information, which is assigned to the image data, representing time when the image data is generated in the parallax derivation mode and the parallax display mode.

In the parallax derivation mode, the memory controller 128 allows the information holding unit 116 to hold the parallax information generated by the parallax information derivation unit 124 in relation to the time information acquired by the time code acquiring unit 126.

FIGS. 6A and 6B are diagrams for describing an example of a process of the memory controller 128. Referring to FIG. 6A, for example, the parallax information derivation unit 124 derives an average value of the parallax ΔX and an average value of the parallax ratio Q of the predetermined number of frames before and after (for example, total 120 frames before and after) time points t1, t2, . . . .

In this case, as shown in FIG. 6B, the time code acquiring unit 126 acquires time information of a frame located at a center among the predetermined number of frames, for example, and the memory controller 128 allows the information holding unit 116 to hold parallax database 174 that includes an identification code 172a for identifying the image data acquired by the image data acquiring unit 112, a management number 172b for identifying the object detected by the object detector 122, parallax (pixel) 172c, that is, the average value of the parallax ΔX of the predetermined number of frames before and after a time 170, and a parallax ratio (%) 172d, that is, the average value of the parallax ratio Q of the predetermined number of frames before and after the time 170, in relation to the time 170 represented by the time information.

The data generator 130 generates parallax time image data that is an image represented in a two-dimensional way, by corresponding the average value of the parallax ratio Q represented by the parallax information to the time represented by the time information, with reference to the parallax database 174 held by the information holding unit 116 in the parallax display mode. Here, a case of generating the parallax time image data of one piece of content (stream) by the data generator 130 will be described as an example.

Figure 7A:
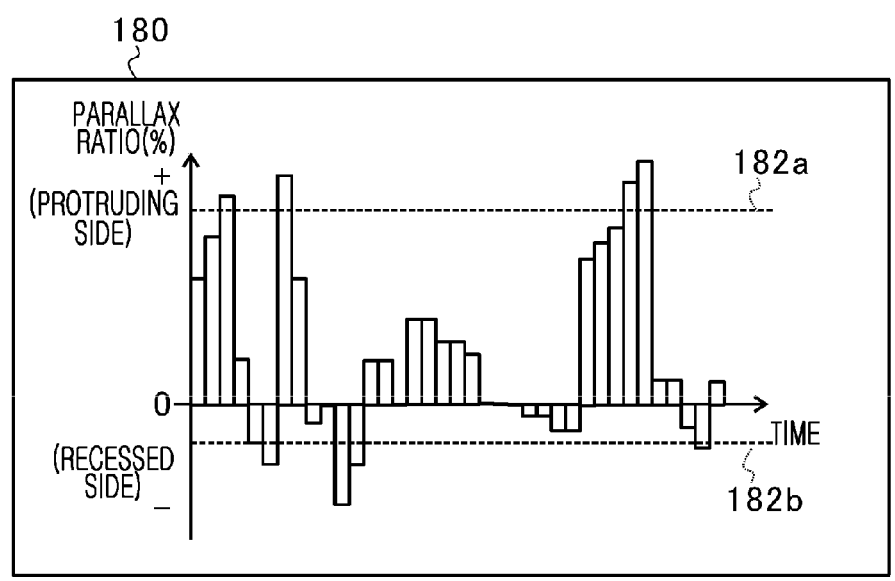
FIGS. 7A through 7C are graphs for describing a process of generating parallax time image data by a data generation unit.
Figure 7B:
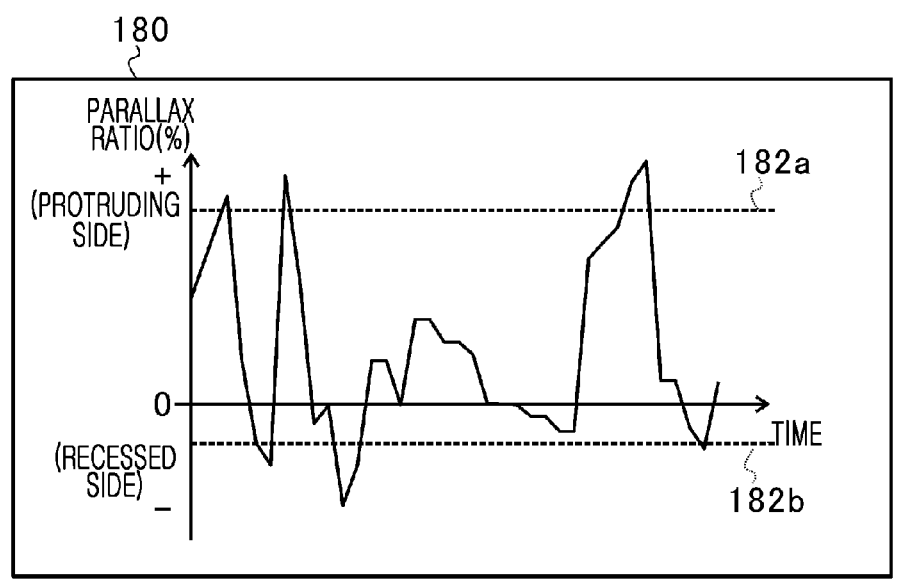
Figure 7C:
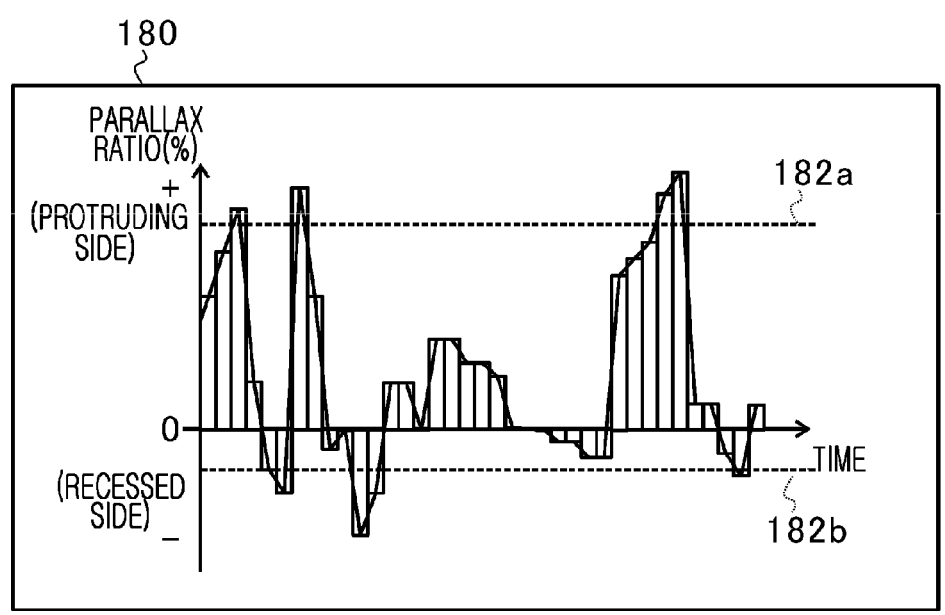

FIGS. 7A through 7C and 8 are diagrams for describing processes of generating the parallax time image data of the data generator 130. As shown in FIG. 7, the data generator 130 generates, for example, parallax time image data 180 representing a graph of a parallax ratio based on the time information held by the information holding unit 116, where a transverse axis of the graph denotes time and a longitudinal axis of the graph denotes the parallax ratio (%). Here, the graph relates to the parallax ratio; however, the graph may relate to parallax (pixel). FIG. 7A is a bar graph showing the parallax ratio, FIG. 7B is a broken line graph showing the parallax ratio, and FIG. 7C is a combination of the bar graph and the broken line graph showing the parallax ratio.

The display controller 132 displays the parallax time image data 180 generated by the data generator 130 on the display unit 142, and thus the manufacturer 10 may grasp a variation according to time in the parallax of the entire image data 150 in one piece of content. Therefore, the manufacturer 10 may match the variation of the parallax to time when a story reaches its climax in one piece of content, and thus the image data 150 desired by the manufacturer 10 may be generated.

Also, the manufacturer 10 generally generates image data for every scene, and connects the image data of the scenes to each other to generate one piece of content. In the present embodiment, since the parallax time image data 180 is displayed on the display unit 42, the manufacturer 10 may grasp the variation according to time in the parallax of one piece of content, and thus may easily grasp the variation in the parallax between scenes.

In addition, points where the parallax varies a lot are mainly so-called important points (points that are worth of seeing) in pieces of content, where scenes or states are frequently changed. Therefore, the manufacturer 10 may easily grasp the points where the parallax varies a lot by seeing the parallax time image data 180, and then may simply edit image data (digest version or trailer version) by collecting scenes that are worth seeing by collecting the image data 150, the parallax of which largely varies.

In addition, as shown in FIGS. 7A, 7B, and 7C, the data generator 130 may cause lines 182a and 182b representing excessive values and the parallax time image data 180 to overlap each other. Here, the excessive values are references of parallax for determining whether the parallax has to be adjusted or not. The excessive value is set in advance by the manufacturer 10 or the like, and the excessive value of a protruding side may be set as +20% and the excessive value of a recessed side may be set as −4%, for example. Here, the line 182a denotes the excessive value of the protruding side and the line 182b denotes the excessive value of the recessed side.

As described above, by causing the lines 182a and 182b, which represent the excessive values, and the parallax time image data 180 to overlap each other, the manufacturer 10 may instantly identify whether the parallax exceeds the excessive values in the image data 150 by only seeing the parallax time image data 180, provided that the manufacturer 10 sets the excessive values at levels of parallax at which eyes of human beings may feel fatigue. Therefore, the image data 150, when the parallax of which exceeds the excessive value, may be edited again or the parallax may be adjusted according to the conventional art, and thus the image data 150 may be generated, wherein the image data 150 is natural and does not apply a visual load to the eyes of the viewer 12.

Figure 8:
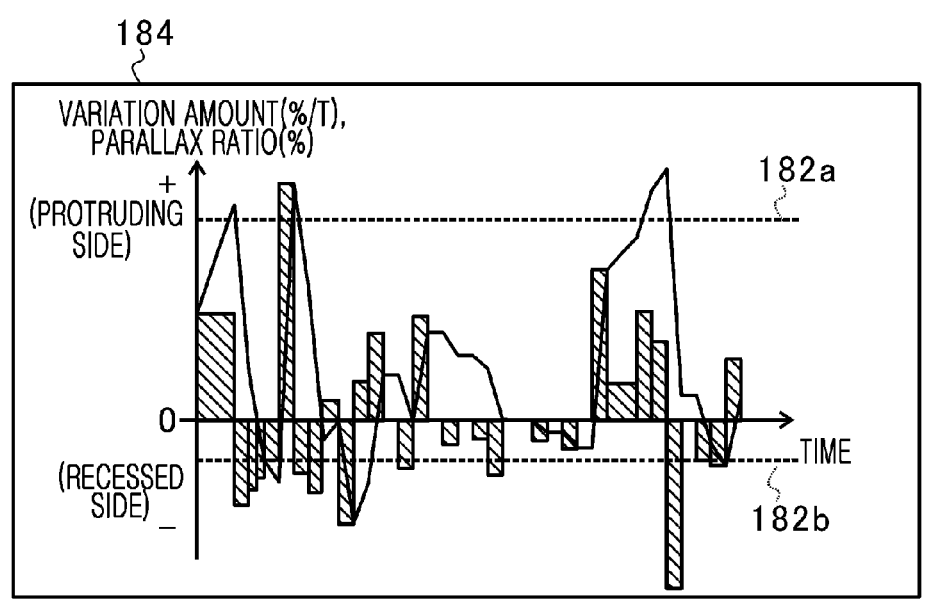
FIG. 8 is a diagram showing a process of generating parallax time image data by a data generation unit.

In addition, the data generator 130 may derive a variation amount (%/T) between parallax at an arbitrary time point and parallax at a next time point. In this case, the data generator 130 generates parallax time image data 184, which is represented as a graph showing the derived variation amount, wherein a transverse axis of the graph denotes time and a longitudinal axis of the graph denotes the variation amount (%/T). In FIG. 8, an example in which a bar graph shows the variation amount and a broken line graph shows the parallax ratio (%) is shown. In addition, the data generator 130 generates the broken line graph showing a variation according to time of the parallax ratio, and calculates an inclination of the broken line graph to derive the variation amount.

As described above, since the data generator 130 generates the parallax time image data 184 which is represented as a graph showing the derived variation amount, the manufacturer 10 may grasp the variation amount of the parallax throughout the entire image data 150 of one piece of content. Therefore, the manufacturer 10 may easily identify the variation amount of parallax between scenes, and accordingly can determine whether the parallax is changed sharply between the scenes.

In addition, in the parallax display mode, the data generator 130 generates current index data representing an image (index) referring to a time position of the display data currently displayed on the display unit 142 in the parallax time image data, and object index data representing an image (index) specifying an object corresponding to the parallax time image data. In the present embodiment, the data generator 130 uses the face detection frames 160*a* and 160*b* generated by the object detector 122 as the object index data. In addition, the data generator 130 may generate the object index data such that displayed shape of the object index data overlapping the right eye image data 150*a* and displayed shape of the object index data overlapping the left eye image data 150*b* by the data overlapping unit 140 may be different from each other.

In addition, in the parallax display mode, the data generator 130 transmits the generated parallax time image data, the current index data, and the object index data with information representing locations (coordinates) where these pieces of data are displayed to the data overlapping unit 140.

The display controller 132 displays overlap data 190 formed by causing the parallax time image data, the current index data, and the object index data and the display data 152 to overlap each other on the display unit 142 in the parallax display mode, where the overlap data 190 will be described later.

The data overlapping unit 140 may include, for example, a character generator, and causes the parallax time image data 180, the current index data 186, the object index data 188, an OSD (on screen display) representing a display state of the display unit 142 or the like transmitted from the data generator 130 and the display data 152 to overlap each other in the parallax display mode. In addition, the data overlapping unit 140 causes the object index data and any one or both of the two pieces of the image data 150 to overlap each other; however, a case where the object index data overlaps both of the two pieces of the image data 150 will be described as an example.

Figure 9:
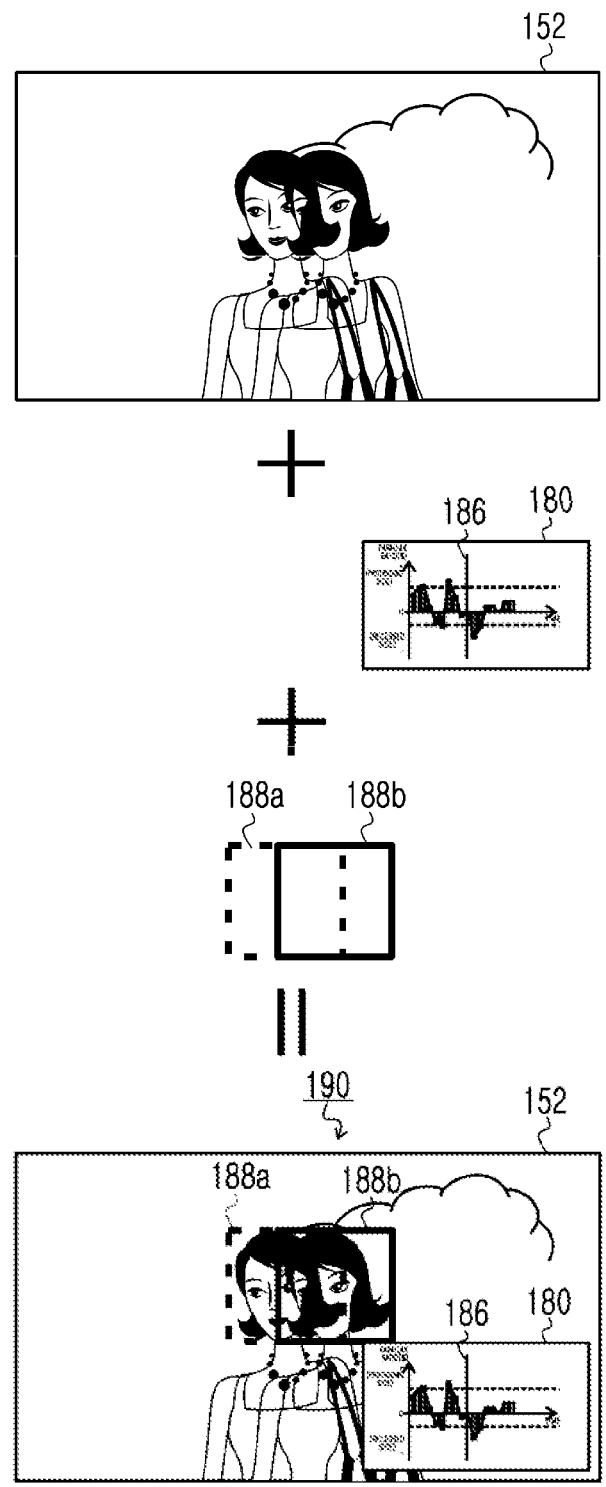
FIG. 9 is a diagram for describing processes of a data overlapping unit.

FIG. 9 is a diagram for describing processes of the data overlapping unit 140. As shown in FIG. 9, the data overlapping unit 140 generates overlap data 190 by causing the parallax time image data 180, the current index data 186, and object index data 188*a* and 188*b* and display data 152 transmitted from the split and composition unit 114 to overlap each other in the parallax display mode.

The display unit 142 may include a liquid crystal display, an organic electro luminescence (EL) display, or the like, and displays display data according to a control signal of the display controller 132. In the parallax display mode, the display unit 142 displays the overlap data 190 in which the data generated by the data generator 130 (the parallax time image data 180, the current index data 186, and the object index data 188*a* and 188*b*) overlaps the display data 152 by the data overlapping unit 140.

Figure 10:
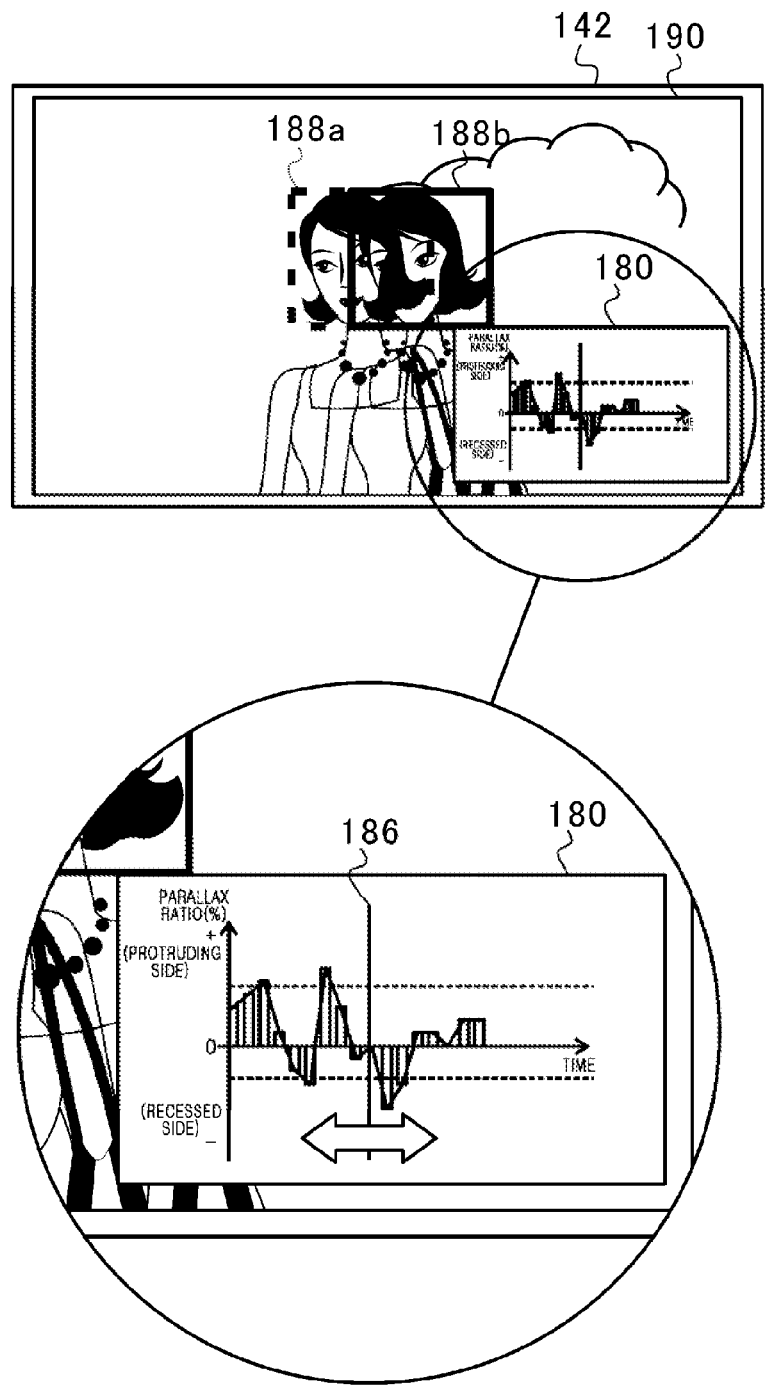
FIG. 10 is a diagram for describing display data displayed on a display unit in a parallax display mode.

FIG. 10 is a diagram for describing the overlap data 190 displayed on the display unit 142 in the parallax display mode. As shown in FIG. 10, the overlap data 190 includes the parallax time image data 180, the current index data 186, and the object index data 188*a* and 188*b*, overlapping with the display data 152.

As described above, when the overlap data 190 is displayed on the display unit 142, the manufacturer 10 may intuitively and rapidly grasp the variation according to time of the parallax or the variation amount of the parallax by seeing the parallax time image data 180.

In addition, the manufacturer 10 may instantly grasp a degree of the parallax of the display data 152 currently displayed by seeing the current index data 186. In addition, if the manufacturer 10 can perform a fast forward or backward operation by rotating the manipulation unit 110 including a dial or the like, the data generator 130 changes a location of displaying the current index data 186 in left and right directions of FIG. 10 (denoted by white arrow of FIG. 10) corresponding to the rotation of the manipulation unit 110.

In addition, the manufacturer 10 can grasp the object, the parallax of which is shown in the parallax time image data 180 currently displayed, by seeing the object index data 188*a* and 188*b*.

As described above, according to the stereoscopic image processing apparatus 106 of the present embodiment, the manufacturer 10 can rapidly and intuitively grasp the variation according to time in the parallax or the variation amount of the parallax by seeing the parallax time image data 180 or 184, that is, the image formed in the two-dimensional way by the parallax information derivation unit 124, and thus the image data 150 of the desired display state may be easily manufactured.

(Stereoscopic Image Processing Method)

Figure 11:
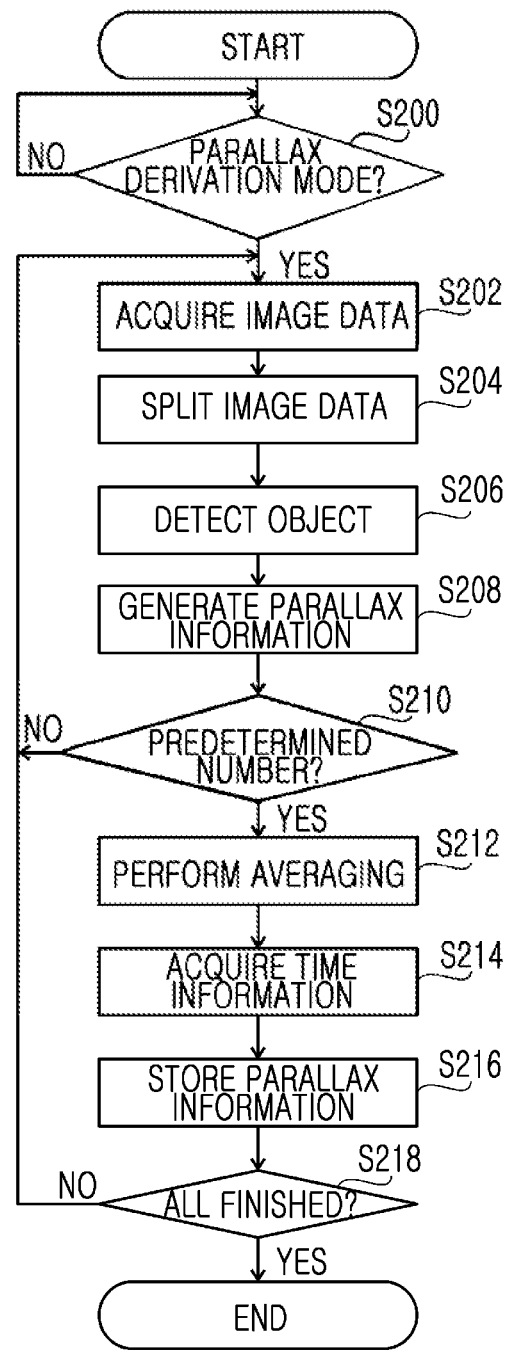
FIG. 11 is a flowchart for describing a flow of processes in a stereoscopic image processing method.
Figure 12:
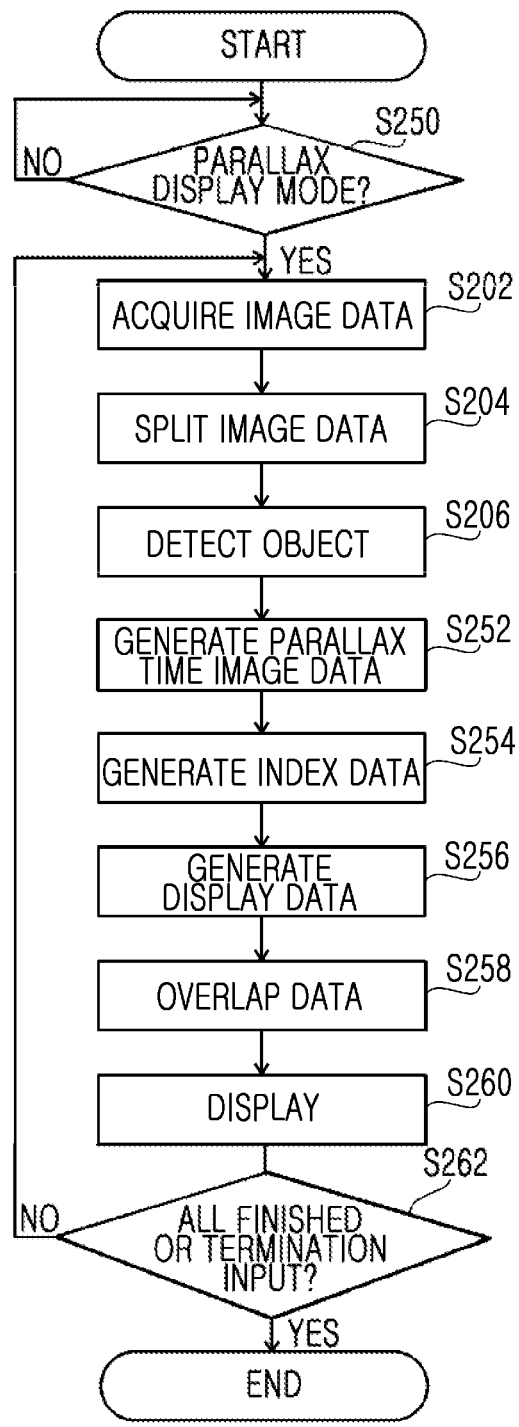
FIG. 12 is a flowchart for describing a flow of processes in a stereoscopic image processing method.

FIGS. 11 and 12 are flowcharts for describing flow of processes in a stereoscopic image processing method according to the present embodiment, wherein FIG. 11 shows flow of processes in the parallax derivation mode and FIG. 12 shows flow of processes in the parallax display mode.

(Parallax Derivation Mode)

As shown in FIG. 11, when the parallax derivation mode is selected according to the manipulation input of the manufacturer 10 through the manipulation unit 110 (YES to operation S200), the image data acquiring unit 112 sequentially acquires two pieces of the image data 150 of one piece of content for each of frame units (S202). The format determination unit 120 determines a format type of the acquired image data 150 and outputs the determination result to the split and composition unit 114, and the split and composition unit 114 identifies the format type according to the determination result and splits the two pieces of image data 150 into the right eye image data 150*a* and the left eye image data 150*b* based on the format type (S204).

In addition, the object detector 122 detects predetermined objects from the right eye image data 150*a* and the left eye image data 150*b* (S206). The parallax information derivation unit 124 derives parallax of the predetermined objects detected by the object detector 122 (S208). In addition, the parallax information derivation unit 124 determines whether the parallax of the predetermined number of frames is derived (S210), and when the parallax of the predetermined number of frames is derived (YES to operation S210), the parallax information derivation unit 124 derives an average of the derived parallax and generates parallax information representing the average value (S212).

On the other hand, the time code acquiring unit 126 acquires time information of a frame located at a center among the predetermined number of frames, for example, used to derive the average of the parallax by the parallax information derivation unit 124 (S214). In addition, the memory controller 128 allows the information holding unit 116 to hold sequentially the parallax information generated by the parallax information derivation unit 124 in relation to the time information acquired by the time code acquiring unit 126 so as to generate the parallax database 174 (S216).

The central controlling unit 118 determines whether the processes from the image data acquiring process (S202) to the parallax information storage process (S216) are performed with respect to all of the frames in the image data of the one piece of content acquired by the image data acquiring unit 112 (S218). When it is determined that the processes S202 through S216 are finished with respect to all of the frames (YES to S218), the parallax derivation mode is finished.

(Parallax Display Mode)

Next, the parallax display mode for displaying the parallax time image data will be described as follows. In addition, the image data acquiring process (S202), the image data split process (S204), and the object detection process (S206) are substantially the same as those of the parallax derivation mode described above, like reference numerals are used, and the descriptions thereof are not provided here.

As shown in FIG. 12, when the parallax display mode is selected according to the manipulation input of the manufacturer 10 through the manipulation unit 110 (YES to operation S250), the stereoscopic image processing apparatus 106 performs the image data acquiring process (S202), the image data split process (S204), and the object detection process (S206).

In addition, the data generator 130 generates the parallax time image data 180 with reference to the parallax database 174 generated in the parallax information storage process S216 in the parallax derivation mode (S252). In addition, the data generator 130 generates the current index data 186 based on the time information granted to the image data 150 split by the split and composition unit 114 in the image data split process S204, and forms the object index data 188 by acquiring the face detection frame 160 generated by the object detector 122 in the object detection process S206 (S254).

The split and composition unit 114 composes the image data 150 split in the image data split process S204 according to the display type of the display unit 142 to generate the display data 152 (S256). The data overlapping unit 140 generates the overlap data 190 by causing the parallax time image data 180 generated in the parallax time image data generation process S252, the current index data 186 and the object index data 188 generated in the index generation process S254, and the display data 152 generated in the display data generation process S256 to overlap each other (S258). In addition, the display controller 132 displays the overlap data 190 on the display unit 142 (S260).

When the display process S260 is finished with respect to all of the frames of the image data of one piece of content acquired by the image data acquiring unit 112 or when the manufacturer 10 performs manipulation input for stopping the display through the manipulation unit 110 (YES to operation S262), the central controlling unit 118 terminates the parallax display mode.

As described above, according to the image processing method using the stereoscopic image processing apparatus 106, the manufacturer of the image data may easily and accurately grasp the parallax of the subject image in the display data.

Also, a stereoscopic image processing program for operating a computer as the stereoscopic image processing apparatus 106, or a computer readable recording medium such as a flexible disc, a magnetooptical disc, a ROM, an erasable programmable ROM (EPROM), an electrically EPROM (EEPROM), a compact disc (CD), a digital versatile disc (DVD), or a Blu-ray disc (BD), recording the stereoscopic image processing program thereon, is also provided. Here, the program refers to a data processing unit that is written in an arbitrary language or in a writing method.

In addition, in the above embodiments, an example of displaying the parallax time image data 180 with respect to one object is described; however, the parallax time image data with respect to each of a plurality of objects may be displayed. In this case, the displaying type of the object index data and the displaying type of the parallax time image data with respect to the same object may be related to each other (for example, displayed with frames of the same color, or the like).

In addition, in the above embodiments, the parallax from all of the frames in one piece of content is derived in the parallax derivation mode, and then the parallax time image data is generated in the parallax display mode and the parallax time image data is displayed on the display unit 142 by the display controller 132. However, the parallax derivation mode and the parallax display mode may be performed in parallel.

Figure 13:
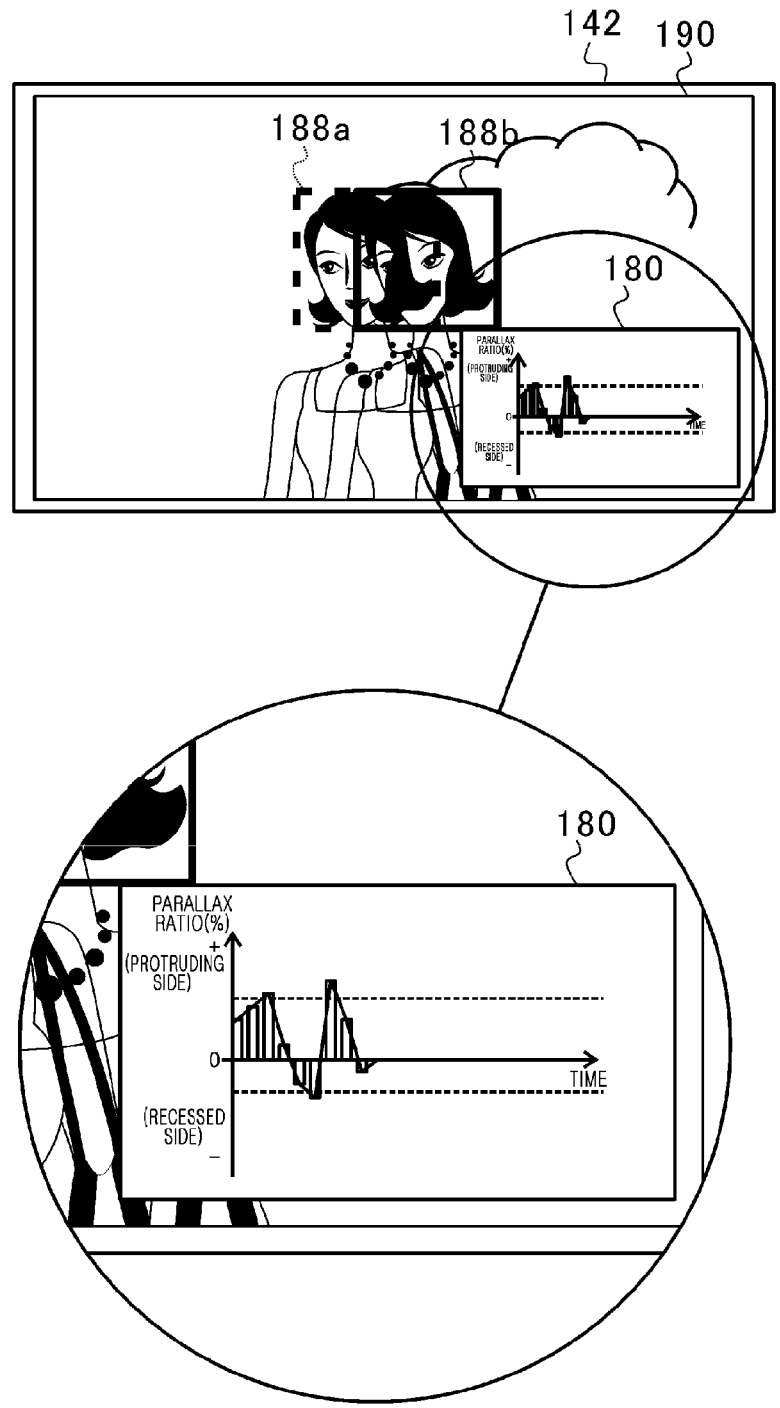
FIG. 13 is a diagram for describing parallax time image data displayed on a display unit when a parallax derivation mode and a parallax display mode are performed in parallel.

FIG. 13 is a diagram for describing parallax time image data displayed on the display unit 142 when the parallax derivation mode and the parallax display mode are performed in parallel. As shown in FIG. 13, when the parallax derivation mode and the parallax display mode are performed in parallel, the parallax time image data 180 is sequentially generated by using the parallax derived by the parallax information derivation unit 124, and the parallax time image data 180 is sequentially displayed with the display data when the display data is generated. Then, the manufacturer 10 may grasp the variation in the parallax in nearly real-time. However, in this case, the current parallax information cannot be displayed, and thus the current index data 186 is not displayed.

In addition, a structure of the stereoscopic image processing apparatus 106 in which the image data acquiring unit 112 acquires the image data 150 generated by another apparatus is described as an example. However, the image data acquiring unit 112 may perform as an imaging unit. In this case, as shown in FIG. 13, when the parallax derivation mode and the parallax display mode are performed in parallel, the manufacturer 10 can grasp the variation in the parallax while performing the imaging operation.

In addition, according to the above described stereoscopic image processing method, the parallax information derivation unit 124 derives the parallax information for each of the predetermined number of frames; but not limited thereto, the parallax information may be derived for every frame, at a timing based on the manipulation input of the manufacturer 10 through the manipulation unit 110, or at predetermined time intervals.

In addition, the parallax information derivation unit 124 may derive a difference between an excessive value and the parallax (excessive parallax), and the display controller 132 may display the excessive parallax on the display unit 142. Accordingly, the manufacturer 10 may recognize the excessive parallax, and therefore may grasp a degree of parallax adjustment simply.

In addition, according to the stereoscopic image processing apparatus 106, the split and composition unit 114 or the data overlapping unit 140 is configured as hardware; however, the present invention is not limited thereto, all of the image processes may be performed by software included in the central controlling unit 118 and the final overlap data 190 in which the parallax time image data, the current index data, and the object index data overlap each other may be displayed on the display unit 142.

While the preferred embodiments of the present invention have been described with reference to the accompanying drawings, they are not intended to limit the present invention. It will be understood by those skilled in the art that various changes in form and details may be made therein without departing from the spirit and scope of the invention as defined by the appended claims.

For example, in the above described embodiments, each of the functional units is provided in a group of the stereoscopic image processing apparatus 106; however, the functional units may be realized as additional apparatuses to achieve the objective of the present invention. For example, the split or composition of the image data 150 performed by the split and composition unit 114 may be realized by using an additional 3D converter, or functions of the data overlapping unit 140 may be implemented by using an additional projector or the like.

In addition, each of the processes in the stereoscopic image processing method is not necessarily performed in a time-series manner according to the order stated in the flowcharts; the processes may be performed in a parallel manner or may include sub-routines.

As described above, according to the present invention, the manufacturer of the image data may easily and accurately grasp the parallax of the subjects in the display data.

The present invention may be used in the stereoscopic image processing apparatus and method capable of displaying display data for allowing a viewer to perceive a stereoscopic image.

What is claimed is:

1. A stereoscopic image processing apparatus, comprising:
   an image data acquiring unit which acquires two pieces of image data having horizontal parallax;
   a split and composition unit which composes the two pieces of image data to generate display data;
   a parallax information derivation unit which derives parallax of a predetermined object in the two pieces of image data and generates parallax information representing the parallax;
   an information holding unit which holds the generated parallax information in relation to time information assigned to each piece of the image data;
   a data generator which generates parallax time image data representing a two-dimensional image in which the parallax represented by the parallax information and time represented by the time information are shown to correspond to each other, and generates current index data representing an index referring to a time position of the display data in the parallax time image data;
   a data overlapping unit which causes the generated parallax time image data, the current index data and the display data to overlap each other; and
   a display controller which displays the display data overlapping the parallax time image data and the current index data on a display unit.

2. The stereoscopic image processing apparatus of claim 1, wherein the parallax time image data is image data which is represented as a graph showing the parallax represented by the parallax information in relation to the time represented by the time information.

3. The stereoscopic image processing apparatus of claim 1, wherein the data generator further generates object index data that represents an index for specifying the predetermined object, and the data overlapping unit causes the object index data and any one or both of the two pieces of image data to overlap each other.

4. A stereoscopic image processing method, comprising:
   acquiring two pieces of image data having horizontal parallax;
   deriving parallax of a predetermined object in the two pieces of image data and generating parallax information representing the parallax;
   holding the generated parallax information in relation to time information assigned to the image data;
   generating parallax time image data representing a two-dimensional image in which the parallax information and the time information are shown to correspond to each other;
   generating display data by composing the two pieces of image data;
   generating current index data representing an index referring to a time position of the display data in the parallax time image data
   causing the generated parallax time image data, the current index data and the display data to overlap each other; and
   displaying the display data overlapping the parallax time image data and the current index data on a display unit.

* * * * *